Feb. 19, 1952 N. OBRAM 2,586,702
AUTO CYCLE AND LIKE POWER ASSISTED VEHICLE
AND MOTOR FOR SUCH VEHICLE
Filed Jan. 15, 1948 2 SHEETS—SHEET 1
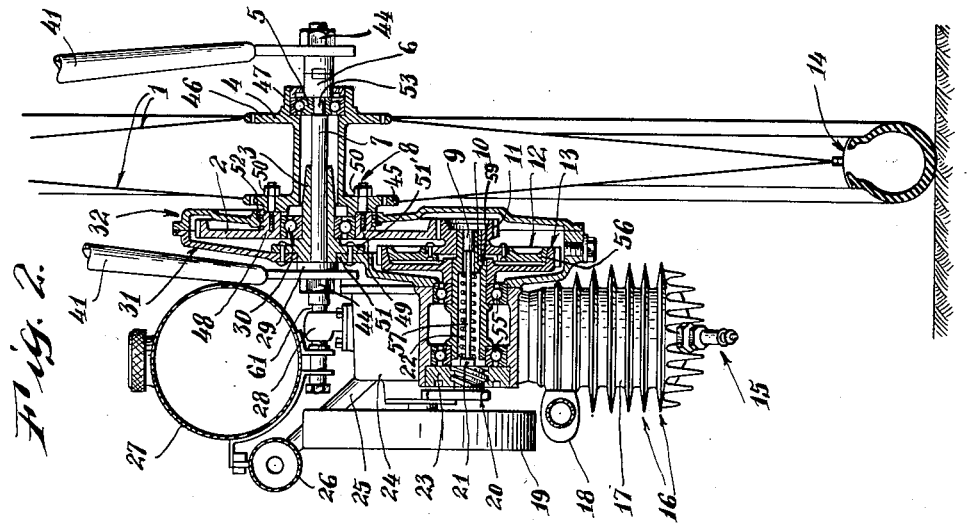
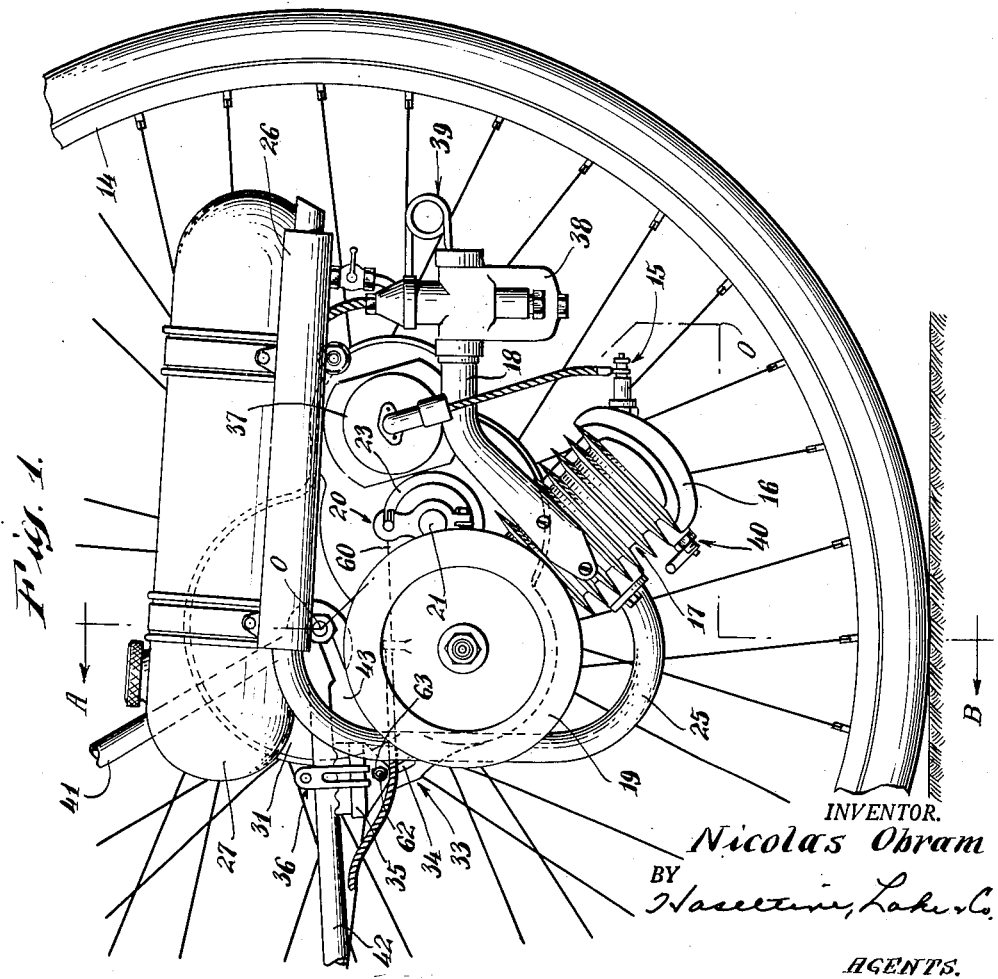
INVENTOR.
Nicolas Obram
BY
Haseltine, Lake & Co.
AGENTS.

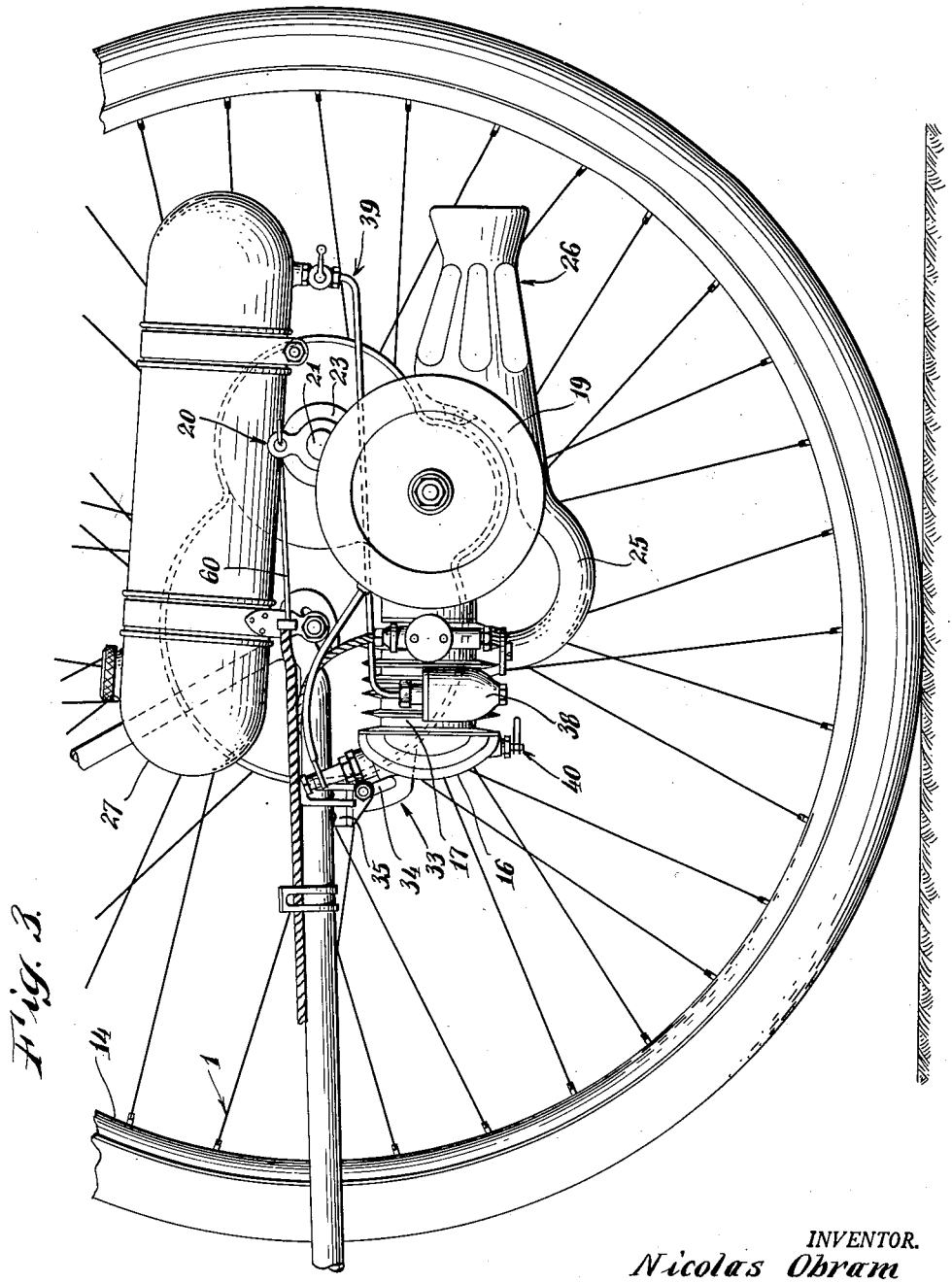

Patented Feb. 19, 1952

2,586,702

UNITED STATES PATENT OFFICE 2,586,702

AUTO CYCLE AND LIKE POWER ASSISTED VEHICLE AND MOTOR FOR SUCH VEHICLE

Nicolas Obram, Liege, Belgium

Application January 15, 1948, Serial No. 2,364
In Belgium January 20, 1947

1 Claim. (Cl. 180—33)

This invention has reference to auto-cycles and like power-assisted vehicles, and to motors for such vehicles.

The principal object of the present invention is to provide a motor which is capable of secure assembly at the rear of the vehicle for transmitting drive positively and directly to the wheel hub from the power unit, through a train of speed reduction gears.

Another object of the invention is to enable a motor to be assembled to the rear of the vehicle without interfering with the normal drive to the rear wheel by crank gear, chain and free wheel, so that the vehicle may be propelled by human and/or motor power in a simple, inexpensive and efficient manner at a speed in the region of three or four times the speed at which a normal cycle can be driven, without causing the rider undue fatigue.

A further object of the invention is to provide a motor and means for mounting same at the rear of the vehicle, which does not necessarily require the manufacturers of the vehicle to make special provision on the vehicle frame for receiving the motor or to strengthen the component parts of the vehicle, although, if desired, certain parts of the vehicle may be strengthened to ensure absolute safety.

Still another object of the invention is to enable the motor to be accommodated at the rear of the vehicle in the best manner possible when the space available is taken into consideration.

The invention also has as an object, means for mounting a motor at the rear of the vehicle which only necessitates modification of those parts of a normal cycle on which the motor is actually to be carried.

Still another object of the invention is to provide an improved auto-cycle or like power assisted vehicle wherein a motor is mounted in a stable, simple and secure manner upon the spindle of the rear wheel and imparts drive to the hub of the said wheel.

The above and other objects and advantages of the invention will become apparent upon consideration of the following detailed specification and the accompanying drawings wherein there are specifically disclosed two preferred embodiments of the invention.

In the drawings:

Figure 1 is an elevation of a portion of the rear wheel and frame of an auto-cycle.

Figure 2 is a section taken along the line A—O—B of Figure 1, and

Figure 3 is a similar view to Figure 1, showing an alternative type and arrangement of the motor which assists in the propulsion of the cycle.

The said drawings show two different motors assembled to an auto-cycle for propelling or assisting in the propulsion of an auto-cycle.

The motor in each case comprises a power unit 24, consisting of a single cylinder internal combustion engine and a train of speed-reduction gears, including the intermediate gears 13 and 11, and the final gear 2, through which drive is transmitted from the crank-shaft (not shown) of the power unit direct to the hub 4 of the rear wheel of the cycle. In the arrangement shown in Figures 1 and 2, the cylinder 17 of the power unit is provided with cooling fins 16, is inclined downwardly and rearwardly relative to the hub 4 and is fired by a magneto 37 and sparking plug 15. Petrol for the power unit is stored in a tank 27 and is fed to the cylinder 17 through a pipe 39, carburettor 38 and intake 18. The exhaust gases flow from the cylinder 17 through an exhaust pipe 25 and silencer 26 whilst smooth running of the power unit is ensured by the provision of a fly-wheel 19.

To facilitate the starting of the power unit and also to enable any oil that may collect in the cylinder head, to be drained away, the cylinder 17 is provided with a decompressor valve 40.

The arrangement shown in Figure 3 differs from that shown in Figures 1 and 2, mainly in that the cylinder 17 of the power unit is disposed horizontally and, instead of providing a magneto for ignition purposes, the fly-wheel 19 is of a known magnetic construction.

The cycle comprises a frame having a rear fork 41 and chain stay 42 of normal construction, the lower end of each arm of the fork having a slot 43 for receiving and locating the wheel spindle 7 transversely of the fork, the said spindle being secured in position by the clamping nuts 44. The rear wheel is built up in a known manner by a system of spokes 1 which extend from the hub flanges 45 and 46 to the tyre-receiving rim 14.

One end of the hub 4 is screw threaded externally at 47, or is otherwise formed, so that it is adapted to have an ordinary free-wheel (not shown in the drawings) mounted thereon to enable drive to be transmitted to the rear wheel from the usual pedal-actuated crank gear, through a chain and the said free-wheel.

As already stated, drive is transmitted from the power unit 24 to the hub 4 through the train of gears 13, 11 and 2. For this purpose, the final gear 2 of the said train projects radially beyond the other gears of the train so that it may be inserted within the fork 41 between the complementary fork arm and the rear wheel of the cycle. Further, the said final gear 2 is formed with a concentric sleeve 48 which is arranged coaxially and in contact with the hub flange 45. This sleeve is rigidly secured to the said flange by bolts 8 which extend through the flange 45 into a concentrically arranged series of holes 49 in the sleeve, and which are engaged by nuts 50.

The gear train is enclosed within a two-piece casing 31, 32, that part of the casing which receives the final gear 2 being sufficiently thin to enable it also to be accommodated between the said complementary fork arm and the said rear wheel.

The casing member 31 is formed, in the thin part of the gear casing, with an aperture 51 into which one end of a steel bush 3 fits closely, the said bush having a peripheral flange 51' which seats against and is secured to the inner face of the said casing member. The bush extends transversely of the thin portion of the casing through the gear-sleeve 48, the latter being socketed into an aperture 52 in the other casing member 32, the apertures 51 and 52 and the sleeve 48 being arranged co-axially. The said bush projects beyond the sleeve 48 into the interior of the hub 4 and a ball or roller bearing 30 is housed within the said sleeve and around the said bush and serves as one of the bearings for the said wheel hub. The other ball or roller bearing 5 for the hub 4 is housed within the free-wheel supporting end of the latter.

The spindle 7 which is secured within the rear fork 41 by the nuts 44 carries the bearing 5 on a machined or trued portion 53 whereas another machined or trued and stronger spindle portion 54 extends through the bore of the bush 3 and forms the main support for the gear train and power unit; a small amount of play exists between the spindle portion 54 and the bush 3.

To prevent lateral movement of the assembly consisting of the hub 4, final gear 2, casing 31 and 32 and bush 3, upon the spindle 7, abutments 6 and 29 are provided on the said spindle between the bearing 5 and bush 3 respectively and the complementary arms of the fork 41, the abutment 6 being adjustable lengthwise of the spindle 7 and each abutment being formed with flat-faced portions (not shown) which engage the sides of the complementary fork slots 43.

The final gear 2 is in constant mesh with the intermediate gear 11 which is carried on a hollow intermediate spindle 10 together with the other intermediate gear 13, the latter being in constant mesh with the primary gear (not shown in the drawings) of the speed reducing train which is fixed to the crank shaft (also not shown) of the power unit 24.

The said intermediate spindle 10 is journalled in the crank case of the said power unit, upon ball or roller bearings 55, the gear 13 being rigid with the spindle 10 whereas the gear 11 is capable of both rotating around, and sliding lengthwise of, the said spindle but is normally connected to the said gear 13 by clutch mechanism.

The said clutch mechanism is constructed by providing the gear 13, on its side adjacent the gear 11, with a recess 56 having a female cone around its internal periphery, and by arranging for a disc 12, which is rigid with the gear 11 and has a male cone around its external periphery, to fit within the said recess so that drive may be transmitted from the gear 13 to the gear 11.

The said clutch mechanism is operable by a rod 57, having enlarged ends 9 and 21, the said rod being housed within the spindle 10 with its end 9 fixed to the gear 11 and its other end 21, which is formed externally thereof with a quick-pitch screw thread, engaging a complementary tapped plate 23 secured within the crank case wall. A coil spring 22 is compressed between the rod end 21 and a shoulder 59 formed internally of the spindle 10; thus, the said spring tends to drive the disc 12 into the gear-recess 56. The rod extends through the plate 23 and a lever 20 is fixed to the projecting rod portion externally of the crank case, the lever being angularly displaceable by a cable 60 for turning the rod 57 about its axis in the direction which, under the action of the threaded end 21, causes the rod to move endwise against spring action and displace the gear 11 lengthwise of the spindle 10, thereby severing the engagement between the disc 12 and gear 13 so that the drive between the power unit and the hub of the rear wheel is interrupted.

The said intermediate gears 11 and 13 are housed within a thicker portion of the casing 31, 32 which is located clear of the cycle frame and can therefore extend laterally to the outside of the latter. The said thicker casing portion is fixed securely and rigidly to the crank case of the power unit and therefore the said unit is supported upon the wheel spindle 7 by the bush 3 and gear casing 31, 32, also laterally of the cycle frame.

The spindle 7 is formed with an extension 61 which projects to the motor-side of the frame.

The crank case of the power unit 24 is provided with two brackets of which one is formed with an eyed end 29 which fits on to the spindle extension 61 and serves as an auxiliary support for the motor unit and which is adapted to relieve the main support, that is the bush 3, of a considerable amount of shock if, for example, the cycle is inadvertently allowed to fall over. The other bracket 33 on the crank case is formed with an arcuate elongated slot 34 in which an abutment plate 35 is anchored by the bolt 62 and nut 63. The said bracket 33 is arranged to project towards the chain stay 42 of the cycle frame so that the said abutment plate 35 may contact the said stay and be retained in its stay-contacting position by a clamp 36 embracing the stay. The said abutment plate is thus adapted to serve as a thrust reaction member for the power unit and the clamp 36 is able to prevent angular movement of the said unit upon the wheel spindle 7, for example, when the motor is being started.

The spindle extension 61 also supports the forward end of the petrol tank 27 the rear end of which is supported by the thicker portion of the gear casing 31, 32. Also, in the arrangement shown in Figures 1 and 2, the spindle extension serves as a support for the forward end of the exhaust silencer 26 and the exhaust pipe 25, the rear end of the said silencer being supported by the gear casing.

The gear casing 31, 32 may be partially filled with oil or lubricant so that the gear train housed therein is automatically lubricated and, to prevent such oil from escaping through the aperture 52 in the casing member 32, the external periphery of the sleeve 48 of the final gear 2, is formed with a screw thread which is of such pitch that, when the said gear is rotated for imparting forward drive to the rear wheel of the cycle, the said thread counteracts oil leakage.

The construction and arrangement of parts described above enables a motor to be mounted on any cycle or similar road vehicle without it being absolutely necessary to modify the vehicle frame or any other part of the vehicle except the rear wheel hub and spindle. Nevertheless, to ensure absolute safety and a greater degree of comfort to the rider, it may be desirable to fit the road wheels with balloon tyres, strengthen the spokes of the rear wheel, employ rivets instead of the usual screws for fixing the mudguards and weld any bracket, for carrying control levers or the like, to the handlebars instead of clamping such brackets in position by nuts and bolts.

The invention also enables the motor to be mounted securely and efficiently in the most favourable position on the vehicle, namely in the vicinity of the rear wheel; the complete motor is carried almost solely by the bush 3 thereby rendering the mounting thereof a simple and speedy operation and enabling a sure and positive driving connection to be effected between the power unit and the rear wheel. Also since the speed-reduction gear is enclosed within the casing, automatic lubrication of the said train is readily obtained and the possibility of oil leakage is reduced to a minimum. Again, the method of assembling the fuel tank and exhaust system enables these two parts to form an integral part of the motor without preventing or interfering with the fitting of a normal luggage carrier. A further advantage of the invention is that oil and petrol leakages due to the bad state of the roads or filling difficulties, are minimised or eliminated.

The grouping of the various component parts of the complete assembly also has the advantage of providing a unit of minimum dimensions of light weight, which can be manufactured without difficulty by mass production methods, whereas the clutch mechanism facilitates control of the vehicle or the starting of the motor, and the method of mounting the gear train provides for the gears to rotate on ball or like bearings.

The above specifically described embodiments of the invention should be considered as illustrative only as obviously changes may be made therein without departing from the spirit or scope of the invention; for example, the cylinder 17 of the power unit may be arranged with its axis vertical or at any other angle to that shown in Figures 1 or 2. The invention therefore is not to be limited except insofar as necessitated by the scope of the appended claim.

Having described my invention what I claim and desire to secure by Letters Patent is:

In the combination which comprises an internal combustion engine having a crank-shaft and a cylinder block, a reduction gear comprising at least two intermediate pinions, a driven wheel, a closed casing rigidly connected to the block and containing the gear, said two intermediate pinions of the gear being mounted side by side on a separate shaft parallel to the motor crank-shaft and to the wheel axis, means for selectively interengaging or disengaging said two intermediate pinions comprising a conical clutch and a control member therefor, the cylinder block being provided with means for mounting the motor outside the rear fork of a bicycle with the casing inside the fork, the improvement comprising an output hub for the gear extending through the casing, a wheel hub comprising a first flange connected to the output hub and a second flange having an inner recess, a first ball-bearing located in said recess, a fixed shaft extending through the casing and supporting the ball-bearing, the output hub and the cylinder block, said fixed shaft being so dimensioned as to permit insertion thereof in the rear fork of standard cycles, the first ball-bearing being supported at one end of the fixed shaft, the intermediate part of the shaft being provided with a coaxial sleeve having a flange extending therefrom, means rigidly connecting the flange of the sleeve to the casing, and a second ball-bearing supported on the sleeve and in turn supporting the output hub, thereby providing a first support for the connected cylinder block and reduction gear in the cycle fork, the other end of said fixed shaft extending outside of the fork and having means connected thereto for suspending the cylinder block.

NICOLAS OBRAM.

REFERENCES CITED

The following references are of record in the file of this patent:

UNITED STATES PATENTS

| Number | Name | Date |
|---|---|---|
| 633,014 | Lawson | Sept. 12, 1899 |
| 2,156,412 | Tingle | May 2, 1939 |
| 2,375,508 | Verots et al. | May 8, 1945 |

FOREIGN PATENTS

| Number | Country | Date |
|---|---|---|
| 445,956 | Germany | June 25, 1927 |
| 561,376 | Germany | Sept. 22, 1932 |